Aug. 7, 1951     O. J. DE SYLVA     2,563,316
ARTICLE OF MANUFACTURE AND METHOD
Filed Nov. 9, 1945
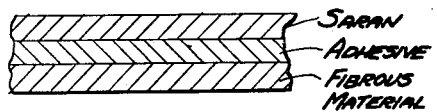
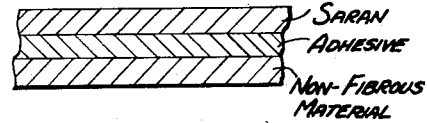
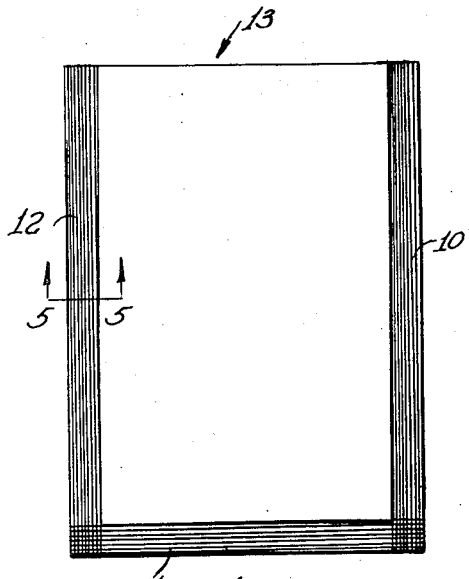
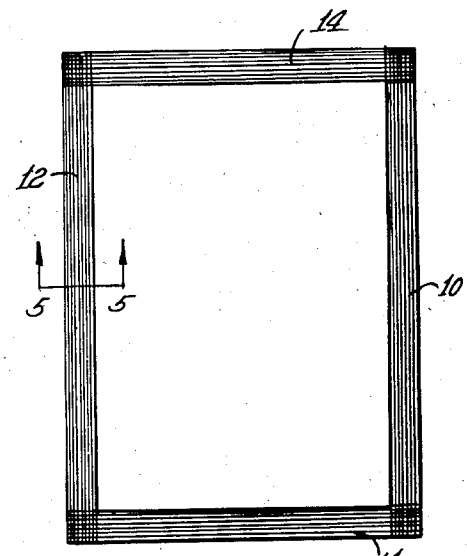
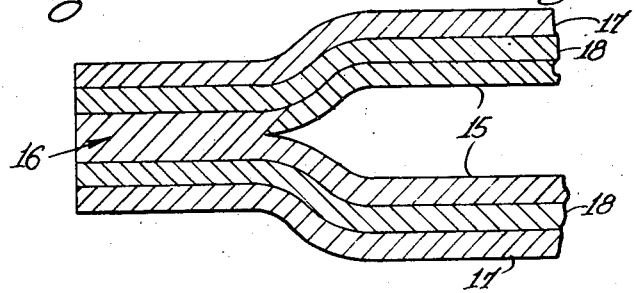
INVENTOR.
Oscar J. DeSylva
BY
Cromwell, Greist & Warden
ATTORNEYS Patented Aug. 7, 1951

2,563,316

UNITED STATES PATENT OFFICE 2,563,316

ARTICLE OF MANUFACTURE AND METHOD

Oscar J. De Sylva, Mount Vernon, Ohio, assignor, by mesne assignments, to Shellmar Products Corporation, Mount Vernon, Ohio, a corporation of Delaware Application November 9, 1945, Serial No. 627,755

4 Claims. (Cl. 206—46)

This invention relates to the manufacture of container materials and containers and packages made therefrom having particular reference to the utilization of Saran as a heat-sealable liner forming the seam construction backed by a dissimilar protective covering of either fibrous or non-fibrous nature adhered thereto by means of a laminating medium which is compatible with the Saran and the protective covering, and the provision of such articles is a principal object of the invention.

Heretofore attempts have been made to seal together contacting faces of Saran, a co-polymer of vinylidene and vinyl chloride, to provide container and packaging material. However, these attempts have not succeeded as far as I am aware because of the immediate disintegration of the material when in direct contact with the heating elements. The advantages of Saran in the packaging field are many. For example, it has good heat-sealable properties, a high resistance to any organic or inorganic materials, has high water and water vapor-proof properties and low temperature flexibility characteristics. Furthermore, it possesses high tensile strength, high elongation characteristics, high dielectric strength and high resistance to atmospheric conditions as well as resistance to ultra violet light. To be able to utilize all these advantages in connection with the manufacture of containers and packages would be a distinct advantage and this is accomplished by means of the present invention by laminating the Saran to a dissimilar material with a proper type of adhesive. This lends additional advantageous characteristics to the Saran by imparting thereto dimensional stability, increased strength and in particular permits a heat-sealing in the manufacture of containers and packages.

The invention accordingly comprises a product possessing the features, properties, and the relation of components which will be exemplified in the product hereinafter described and the scope of the application of which will be indicated in the claims.

For a fuller understanding of the nature and objects of the invention, reference should be had to the following detailed description taken in connection with the accompanying drawing, in which:

Fig. 1 is an enlarged sectional view of a fragmentary portion of a laminated structure embodying the invention;

Fig. 2 is a view similar to Fig. 1, illustrating another modification of the invention;

Fig. 3 illustrates a container made from materials such as those depicted in Figs. 1 and 2;

Fig. 4 illustrates a completed hermetically sealed package made from a container such as that illustrated in Fig. 3 after the same has been filled; and Fig. 5 is an enlarged cross-sectional view of a fragmentary portion of the container, taken along the lines 5—5 of either Fig. 3 or Fig. 4.

Referring more particularly to the drawing, there is shown in Fig. 1 a laminated structure of Saran and a fibrous material, secured together by an adhesive which is compatible with both the Saran and the fibrous material. By fibrous material is meant such materials as cloth, kraft papers, sulphite papers, parchment papers, glassine, bonded stock and the like. An adhesive which is particularly compatible with the Saran and fibrous material, and which permits of the utilization of such a structure by heat-sealing in the form of packaging, is a composition such as the following:

Saran adhesive

| | Per cent |
|---|---|
| Polymerized vegetable oil | 40.0 |
| Chlorinated rubber | 10.0 |
| Toluene | 40.0 |
| Methyl ethyl ketone | 10.0 |

In Fig. 2, the modification is different in that a non-fibrous material is utilized, being laminated to the Saran by means of an adhesive which can be the same as that above specified. By non-fibrous material is meant such materials as aluminum and lead foils, metallic webs, cellophane, cellulose, acetate, other vinyl films, copolymers of acetate-chloride, and ethyl cellulose film.

In Fig. 3 there is illustrated a container made from such a laminated structure. This is done by superposing laminating webs thereof with the Saran in face-to-face relationship. This structural arrangement should then be laminated marginally to form seam constructions 10, 11 and 12, leaving a mouth or filling opening indicated generally at 13. After the package or container has been filled, the mouth opening is similarly sealed marginally as at 14 (Fig. 4) and a hermetically sealed package is provided.

The seam structure which results is indicated in Fig. 5. It will be observed that the marginal portions of the Saran's inner liner 15 have become autogenously bonded, or fused, into a unitary mass as indicated generally at 16 which provides an excellent hermetic seam construction, and this is made possible because of the fact that the Saran has first been laminated to an outer protective covering of similar webs 17, 17, by means of a proper adhesive 18, 18.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A container comprising walls of laminated flexible sheet material made of a web of Saran and an insulating web of dissimilar flexible packaging material arranged in face-to-face relation with the Saran webs disposed innermost to provide an inner liner for said container, and said dissimilar material disposed outermost to provide an outer protective covering therefor, said webs being laminated together by means of a laminating adhesive compatible with said webs, and marginal portions thereof being heat-sealed together to provide seam constructions and a mouth opening for filling said container, the Saran webs, in the area of the seam construction, being fused into a unitary mass.

2. A container comprising walls of laminated flexible sheet material made of a web of Saran and an insulating web of dissimilar flexible packaging material arranged in face-to-face relation with the Saran webs disposed innermost to provide an inner liner for said container, and said dissimilar material disposed outermost to provide an outer protective covering therefor, said webs being laminated together by means of a laminating adhesive comprising polymerized vegetable oil 40.0%, chlorinated rubber 10.0%, toluene 40.0% and methyl ethyl ketone 10.0%, said quantities being approximate, and marginal portions of said webs being heat-sealed together to provide seam constructions for filling said container, the Saran webs, in the area of said seam constructions, being fused into a unitary mass.

3. An hermetically sealed package comprising flexible walls of laminated sheet material made of a web of Saran and an insulating web of dissimilar flexible packaging material arranged in face-to-face relation with said Saran webs disposed innermost to provide an inner liner for said container and said dissimilar material disposed outermost to provide an outer protective covering therefor, said webs being laminated together by a laminating adhesive compatible with said webs, and marginal portions of said arranged webs being heat-sealed together to provide a container with side and bottom seam constructions and a mouth opening for filling said container, which container when filled being sealed across said mouth opening to provide a mouth closure seam construction, said Saran webs in the area of said seam constructions being fused into a unitary mass to provide said hermetically sealed package.

4. An hermetically sealed package comprising flexible walls of laminated sheet material made of a web of Saran and a web of dissimilar flexible packaging material arranged in face-to-face relation with said Saran webs disposed innermost to provide an inner liner for said container and said dissimilar material disposed outermost to provide an outer protective covering therefor, said webs being laminated together by a laminating adhesive comprising polymerized vegetable oil 40.0%, chlorinated rubber 10.0%, toluene 40.0% and methyl ethyl ketone 10.0%, said quantities being approximate, and marginal portions of said arranged webs being heat-sealed together to provide a container with side and bottom seam constructions and a mouth opening for filling said container, which container when filled being sealed across said mouth opening to provide a mouth closure seam construction, said Saran webs in the area of said seam constructions being fused into a unitary mass to provide said hermetically sealed package.

OSCAR J. DE SYLVA.

REFERENCES CITED

The following references are of record in the file of this patent:

UNITED STATES PATENTS

| Number | Name | Date |
|---|---|---|
| 1,695,657 | Ellis | Dec. 18, 1928 |
| 2,069,335 | Salfisberg | Feb. 2, 1937 |
| 2,196,579 | Reinhardt | Apr. 9, 1940 |
| 2,231,791 | Bensel | Feb. 11, 1941 |
| 2,234,621 | Brous | Mar. 11, 1941 |
| 2,354,855 | Emanuel | Aug. 1, 1944 |